United States Patent
Lee et al.

(10) Patent No.: US 9,835,731 B2
(45) Date of Patent: Dec. 5, 2017

(54) DETECTOR PACKAGES

(71) Applicant: Halliburton Energy Services, Inc., Houston, TX (US)

(72) Inventors: Dongwon Lee, Kingwood, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 32 days.

(21) Appl. No.: 14/649,004

(22) PCT Filed: Dec. 11, 2013

(86) PCT No.: PCT/US2013/074320
§ 371 (c)(1),
(2) Date: Jun. 2, 2015

(87) PCT Pub. No.: WO2015/088507
PCT Pub. Date: Jun. 18, 2015

(65) Prior Publication Data
US 2015/0369927 A1    Dec. 24, 2015

(51) Int. Cl.
*G01T 1/20* (2006.01)
*G01V 5/06* (2006.01)

(52) U.S. Cl.
CPC .......... *G01T 1/2002* (2013.01); *G01T 1/2018* (2013.01); *G01V 5/06* (2013.01)

(58) Field of Classification Search
CPC ........ G01T 1/2002; G01T 1/2018; G01V 5/06
See application file for complete search history.

(56) References Cited

U.S. PATENT DOCUMENTS

| | | | |
|---|---|---|---|
| 4,795,910 A | 1/1989 | Henderson et al. | |
| 6,404,785 B1 * | 6/2002 | Scheps | H04B 7/0613 370/203 |
| 8,536,532 B1 * | 9/2013 | Kross | G01T 1/16 250/361 R |
| 2007/0029493 A1 | 2/2007 | Kniss et al. | |
| 2010/0223010 A1 | 9/2010 | Nikitin et al. | |
| 2011/0304263 A1 * | 12/2011 | Xia | H01L 27/3211 313/504 |

(Continued)

OTHER PUBLICATIONS

Wu et al. "Tridentate cyclometalated platinum(II) complexes with strong absorption of visible light and long-lived triplet excited states as photosensitizers for triplet-triplet annihilation upconversion" Aug. 14, 2012, Sciverse ScienceDirect, Dyes and Pigments 96, pp. 220-231.*

(Continued)

*Primary Examiner* — David Porta
*Assistant Examiner* — Mindy Vu
(74) *Attorney, Agent, or Firm* — Gilliam IP PLLC

(57) ABSTRACT

Various embodiments can include apparatus or methods to operate and provide detection packages. In various embodiments, detection packages may include an illuminating device, a photodetector, and an optical coupling component disposed between the illuminating device and the photodetector, where the optical coupling component can be structured to enhance the coupling of light from the illuminating device to the photodetector. Additional apparatus, systems, and methods are disclosed.

25 Claims, 6 Drawing Sheets

(56) References Cited

U.S. PATENT DOCUMENTS

2012/0187081 A1     7/2012   Philip et al.
2012/0267519 A1   10/2012   Nikitin et al.

OTHER PUBLICATIONS

"European Patent Application No. 13899156.7, Office Action dated May 18, 2016", 2 pgs.
"European Patent Application No. 13899156.7, Response filed Jul. 19, 2016 to Office Action dated May 18, 2016", 10 pgs.
"International Application Serial No. PCT/US2013/074320, International Search Report dated Oct. 1, 2014", 3 pgs.
"International Application Serial No. PCT/US2013/074320, Written Opinion dated Oct. 1, 2014", 9 pgs.

* cited by examiner

DETECTOR PACKAGES

TECHNICAL FIELD

The present invention relates generally to apparatus and methods of making and evaluating measurements.

BACKGROUND

In drilling wells for oil and gas exploration, understanding the structure and properties of the associated geological formation provides information to aid such exploration. A number of different measurements in a borehole can be performed to attain this understanding. Further, the usefulness, efficiency, and accuracy of traditional measurements may be related to the precision or quality of the techniques to attain and process data derived from such measurements. Techniques and apparatus to simplify measurements, to enhance processing of measured data, to enhance analysis of data from measurements to provide properties of a formation or a borehole, or to provide combinations thereof can further aid in drilling operations.

In field applications using a scintillation detector coupled to a commercial photodetector, detection systems are designed to maximize their detection efficiency by matching the wavelength of scintillation light to the spectral response curve of a photodetector. A scintillation detector produces light in response to incident radiation. A scintillation detector is herein referred to as a scintillator. In an ideal system, the region of highest intensity in the emission spectrum of the scintillator is aligned to overlap the region of highest quantum efficiency in the spectral response curve of the photodetector. Typically, a decision on the choice of a scintillator is made to meet the goal of specific applications, followed by selection of a photodetector whose spectral response is well matched to the chosen scintillator. However, this matching process is practical only when there is a sufficient number of photodetector devices, such as photomultiplier tubes (PMTs), available from which to choose. However, selection of a PMT in a well logging application is limited to those designed, ruggedized, and manufactured for high temperature environment. Such PMTs, with a high temperature bi-alkali photocathode, show maximum detection efficiency with the incident scintillation light whose wavelength is around 400 nm. Many commercial scintillators of interest in well logging applications show their highest light intensity with much longer wavelengths than 375 nm. These differences in output wavelength of the scintillator and the wavelength response of the photodetector device result in impractical detection efficiency. This problem has been slowing down the use of newer scintillators in well logging applications, because their wavelengths are less optimal to be implemented.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, an optical coupling component can be used to improve the matching of a scintillator emission spectrum to spectral responses of photodetectors. The optical coupling component, disposed between the scintillator and one or more photodetectors, can be structured to provide upconversion of light from the scintillator. Upconversion includes the absorption of light at one wavelength and emission of light at a shorter wavelength in response to the absorption of light. The optical coupling component may be realized by a device that provides upconversion or the upconversion can be based on properties of the structure of materials used in the optical coupling component. For example, materials can be used in the optical coupling component that includes using chemical complexes designed to perform photon triplet-triplet annihilation upconversion (TTA-UC). Other mechanisms of photon upconversion can include, but are not limited to, excited state absorption (ESA), photon avalanche (PA), and energy transfer upconversion (ETU). TTA-UC is considered to be a photochemical upconversion. The TTA-UC mechanism works with low light intensity conditions, while other mechanisms may be inefficient with low intensity light.

To mitigate problems associated with mismatch between the scintillator emission spectrum and the spectral response of photodetectors, an optical coupling medium can be doped, coated with, or doped and coating with a material that provides optical upconversion. For example, the material can be a TTA-UC chemical complex or a combination of TTA-UC chemical complexes. The scintillation light with longer wavelength is absorbed either in the surface coating or in the medium in order to excite TTA-UC molecules. Excited energy states can undergo a triplet-triplet annihilation (TTA) process such that light emitted from the optical coupling component is upconverted light with shorter wavelengths. By choice of materials for the optical coupling component, choice of the scintillator, and choice of photodetector, the upconverted light can be shifted to the region of peak quantum efficiency of the selected photodetector.

Figure 1:
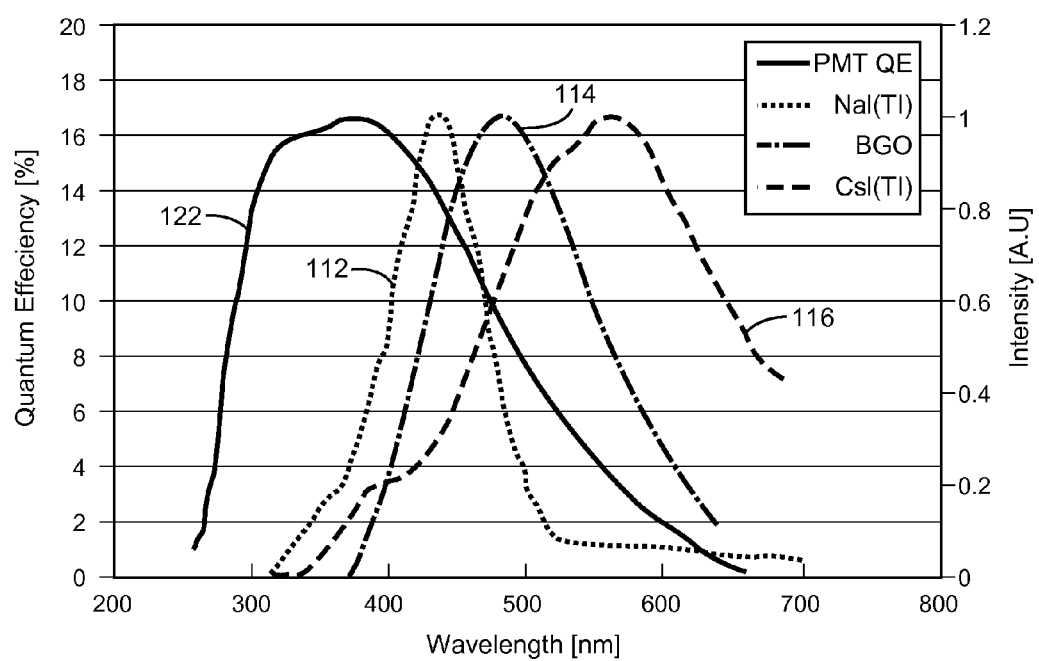
FIG. 1 shows a quantum efficiency (spectral response) curve of a commercial PMT and scintillation emission spectra of a few scintillators, in accordance with various embodiments.

FIG. 1 shows a quantum efficiency (spectral response) curve of a commercial PMT and scintillation emission spectra of a few scintillators commonly used in the field. For this example, the commercial PMT is a Hamamatsu R1288 PMT, whose quantum efficiency curve is shown as curve 122. High temperature PMTs perform best with incident light having a wavelength around 400 nm due to the high temperature bi-alkali photocathode used in the PMT. This constraint limits use of scintillator detectors whose peak wavelengths are much longer than 400 nm. Common scintillators include scintillators using bismuth germanium oxide (BGO) with example spectral response shown in curve 114, and scintillators using cesium iodide doped with thallium CsI(Tl) with example spectral response shown in curve 116. An example spectral response of a scintillator using sodium iodide doped with thallium NaI(Tl) is shown in curve 112. BGO shows its peak wavelength at 480 nm and CsI(Tl) at 550 nm as shown in FIG. 1. Benefits from using a BGO scintillator or newly developed scintillator detectors are less appreciated because poor detection efficiency is unavoidable.

Figure 2:
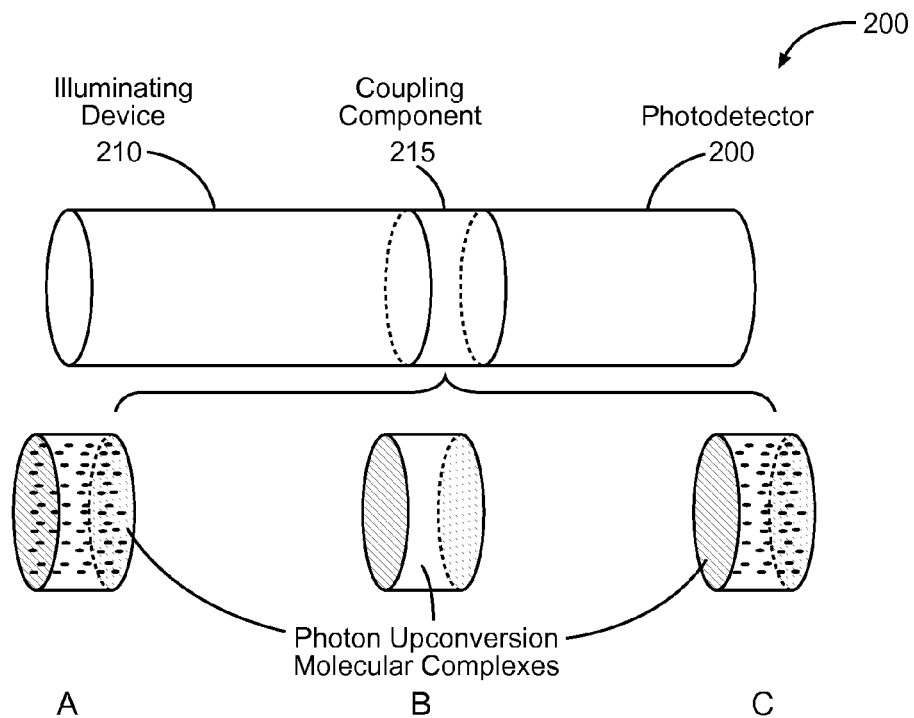
FIG. 2 depicts a block diagram of an example layout of a detector package, in accordance with various embodiments.

FIG. 2 shows an embodiment of an example layout of a detector package 200. The detector package 200 includes an illuminating device 210 that produces a light signal in response to radiation incident to the illuminating device 210, a photodetector 220, and a coupling component 215. The illuminating device 210 can be a scintillator that produces a light signal in response to radiation. For example, the radiation may be a gamma ray. The illuminating device 210 can be, but is not limited to, a gamma-ray scintillator. The photodetector 220 is a device that produces an electrical signal in response to light incident on the photodetector 220. The photodetector can be, but not limited to, a PMT, a photodiode, a phototransistor, or other device that converts incident photons to a current or voltage. The coupling component 215 can be arranged to provide a mechanism to couple the illuminating device 210 and the photodetector 220. The optical coupling component 215 can be disposed between the illuminating device 210 and the photodetector 220, where the optical coupling component 315 can be structured to match an emission wavelength of the illuminating device 210 to a spectral response of the photodetector 220. The coupling component 215 can be structured to enhance the light transmission between the illuminating device 210 and the photodetector 220.

The coupling component 215 can enhance the light transmission between the illuminating device 210 and the photodetector 220 by upconverting the light from the illuminating device 210. In FIGS. 2, A, B, and C depict different structural formats that may be used as coupling component 215. The upconversion capability can be realized by using (A) an optical coupling medium doped with material to provide the upconversion, (B) an optical coupling medium coated with material to provide the upconversion, or (C) an optical coupling medium doped and coated with material to provide the upconversion. The upconversion material can include, but is not limited to, TTA-UC chemical complexes.

A combination of photochemical upconversion molecular complexes can either be doped in optical coupling component 215 or coated on one or more of the surfaces of optical coupling component 215. The molecular complexes can be, but not limited to, DPA (9,10-diphenylanthracene) combined with platinum(II) bisacetylide complexes; for example, dbbpy platinum(II) bis(coumarin acetylide), dbbpy=4,4'-ditert-butyl-2,2'-bipyridine also known as Pt-1. Other TTA-UC chemicals may include, but are not limited to, [Ru(dmb)3]2+ and anthracene, [Ru(dmb)3]2+ and DPA, [Ru(dmb)3]2+ and DMA, Biacetyl and PPO (2,5-Diphenyloxazole), PdPc(OBu)8 (Pd(II) octabutoxyphthalocyanine) and Rubrene, Ir(ppy)3 (tris(2-phenylpyridine) iridium) and Pyrene, PtTPBP (Pt(II) tetraphenyltetrabenzoporphyrin) and BD-1 (dibenzothiophene), PtTPBP and BD-2 (dibenzofuran), PtTPBP and Perylene, PtTPBP and 2CBPEA (2-chloro-bis-phenylethynylanethracene), TIHF (2,4,5,7-tetraiodo-6-hydroxy-3-fluorenone) and DPA, PQ4Pd (Pd(II) tetrakisquinoxalino porphyrin) and Rubrene, PdOEP (Pd(II) octaethylporphyrin)+DPA in P(EO/EP), PdOEP+DPA in Toluene, and PtOEP (Pt(II)octaethylporphyrin) and Polyfluorene. Both doping and coating may be applied to maximize the conversion efficiency.

The optical coupling medium that is the basic structure of the optical coupling component 215 can be an optical fiber, glass, plastic, or other material that provides for transmission of an optical signal through it. The optical coupling medium can be doped using conventional procedures for forming and doping optical elements. The doping may include nanoparticles. When coating the optical coupling medium, either or both faces of the optical coupling medium that couples to the illuminating device 210 and the photodetector 220 can be coated. Alternatively, the illuminating device 210 and the photodetector 220 can be coated with upconversion material or doped in a region near the surface of these devices.

Figure 3:
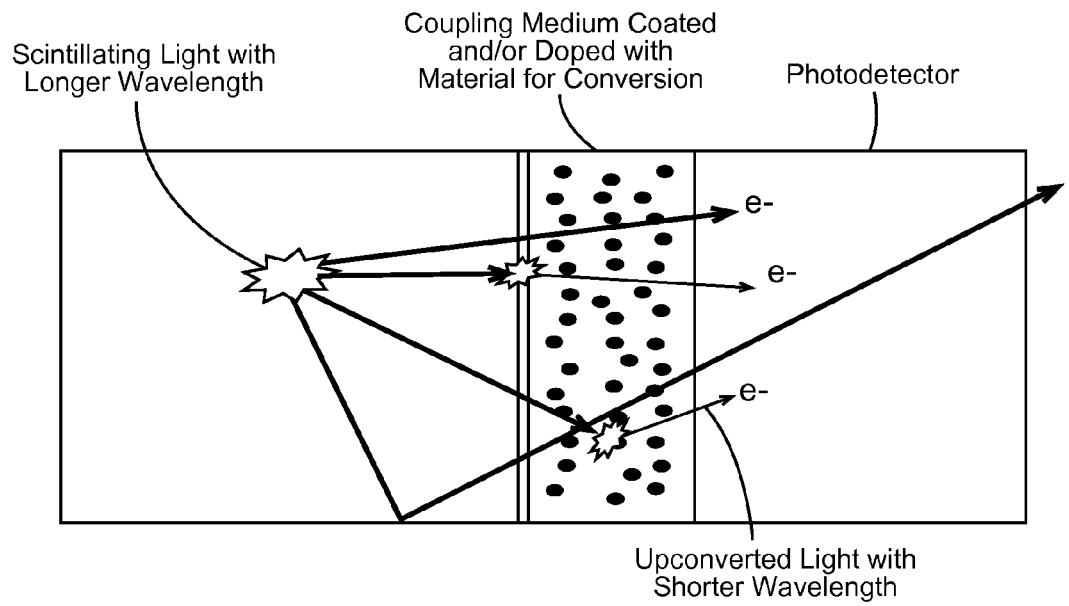
FIG. 3 shows a schematic diagram of an example scintillation process using a coupling medium coated and/or doped with material for upconversion, in accordance with various embodiments.

FIG. 3 shows a schematic diagram of an embodiment of a scintillation process using a coupling medium coated and/or doped with material for upconversion. The material for upconversion can include TTA-UC chemical complexes. As shown in FIG. 3, scintillation light is generated with a wavelength longer than wavelengths corresponding to the spectral response of a photodetector being used. The generated light propagates from the scintillator to the photodetector through a coupling component. The scintillation light incident on the coupling component is upconverted to light of a short wavelength that is completed to the photodetector. In the photodetector, the upconverted light is converted into an electrical signal.

Structures and methods, similar to or identical to structures and methods disclosed herein, that shift the scintillation wavelengths down to the peak wavelengths of photodetectors can improve detection efficiency in well logging applications using these photodetectors. This arrangement can be achieved by modifying a sub-component already in use. A coupling medium between the scintillator detector and the photodetector in a downhole tool can be used to interface the two components optically and to absorb vibrational shock protecting both components. A properly selected combination of TTA-UC chemical complexes can be doped into or coated on the surface(s) of the coupling medium and no further modification in the detector assembly would be necessary. Alternatively, a new optical coupling component can be structured to provide absorption of vibrational shock and provide the medium for upconversion. In addition, various TTA-UC chemical complexes can be engineered to work with a scintillator detector of interest. TTA-UC process is one of the promising technologies in light harvesting and various combinations of chemical complexes are being introduced to achieve higher conversion efficiency. This technology can be incorporated into the existing logging tools without significant modifications. Properly engineered TTA-UC chemical complexes may improve the detection efficiency of the scintillator detector units in logging tools.

Figure 4:
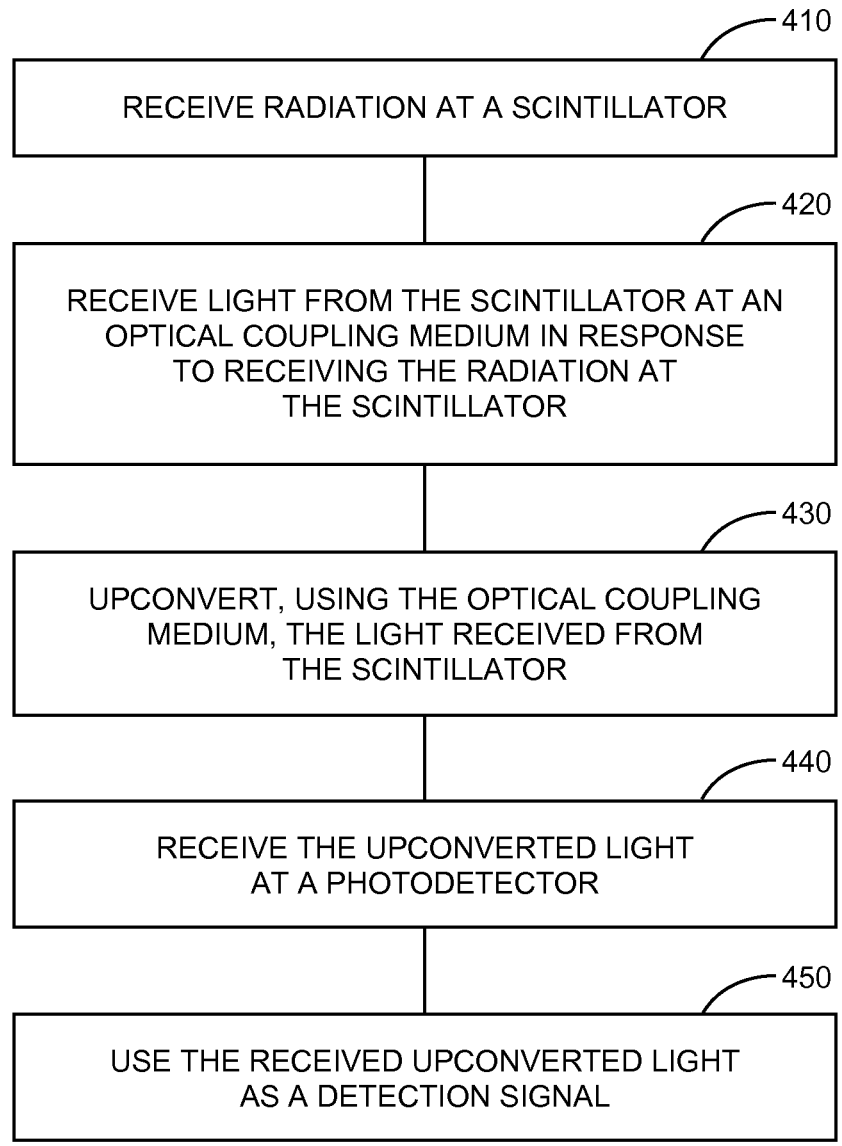
FIG. 4 shows features of an example method of operating a detection package, in accordance with various embodiments.

FIG. 4 shows features of an embodiment of an example method of operating a detection package. At 410, radiation is received at a scintillator. At 420, light from the scintillator is received at an optical coupling medium in response to receiving the radiation at the scintillator. At 430, the light received from the scintillator is upconverted, using the optical coupling medium, to light at a lower wavelength. The scintillator can be a gamma-ray scintillator. The optical coupling component can be realized as an optical coupling medium that is doped, coated, or doped and coated to match the emission wavelength of the scintillator to the spectral response of the photodetector. The optical coupling medium can be doped, coated, or doped and coated with a molecular complex. The molecular complex can be structured to perform photon triplet-triplet annihilation upconversion.

At 440, the upconverted light is received at a photodetector. At 450, the received upconverted light is used as a detection signal. In various embodiments, methods can include absorbing vibrational shock, using the optical coupling medium, to protect both the illuminating device and the photodetector. In various embodiments, receiving the radiation at the scintillator, receiving the light at the optical coupling medium, and upconverting the light can be conducted in a housing operable in a wellbore.

In various embodiments, components of a system are operable to conduct simulations of apparatus and methods, as described herein or in a similar manner. These implementations can include a machine-readable storage device having machine-executable instructions, such as a computer-readable storage device having computer-executable instructions, which instructions when executed cause a machine to perform operations. The operations can include simulations of operations to receive radiation at a scintillator; receive light from the scintillator at an optical coupling medium in response to receiving the radiation at the scintillator; upconvert, using the optical coupling medium, the light received from the scintillator to light at a lower wavelength; receive the upconverted light at a photodetector. The simulations may include using the received upconverted light as a detection signal. The simulations can be controlled by one or more processors based on instructions stored in one or more machine-readable storage devices. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 5:
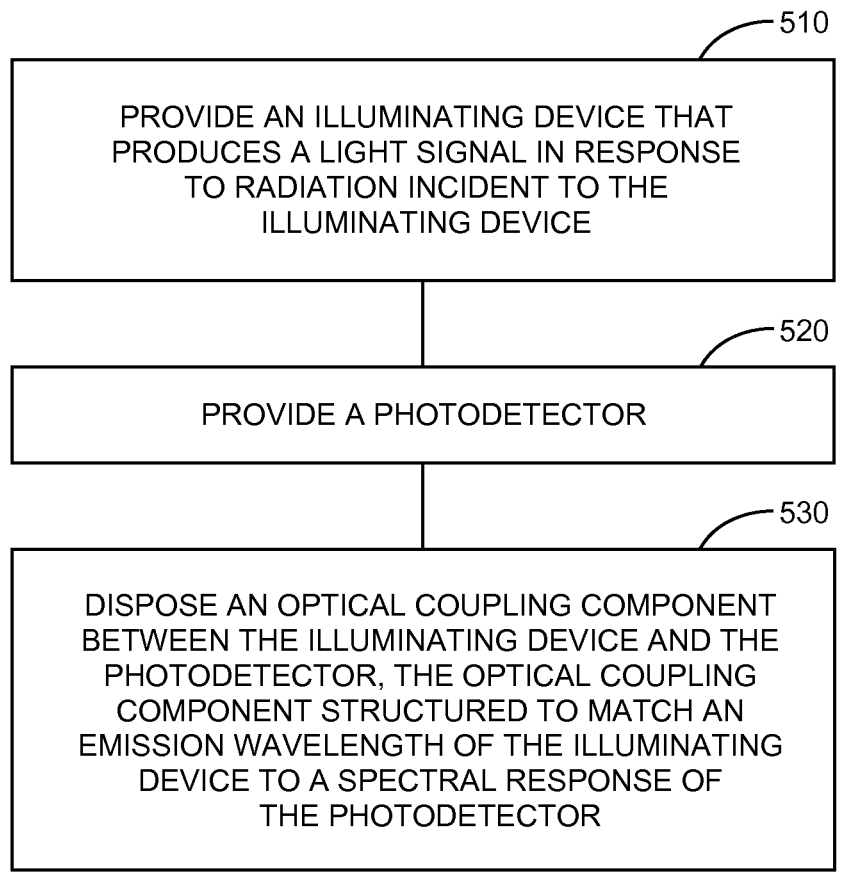
FIG. 5 shows features of an example method of providing a detection package, in accordance with various embodiments.

FIG. 5 shows features of an embodiment of an example method of providing a detection package. At 510, an illuminating device that produces a light signal in response to radiation incident to the illuminating device is provided. Providing the illuminating device can include providing a scintillator. At 520, a photodetector is provided.

At 530, an optical coupling component is disposed between the illuminating device and the photodetector, the optical coupling component structured to match an emission wavelength of the illuminating device to a spectral response of the photodetector. Disposing the optical coupling component can include disposing an optical upconverter. Disposing the optical coupling component can include disposing an optical coupling medium that is doped, coated, or doped and coated to match the emission wavelength of the illuminating device to the spectral response of the photodetector. The optical coupling medium can be doped, coated, or doped and coated with a molecular complex. The molecular complex can be structured to perform photon triplet-triplet annihilation upconversion.

In various embodiments, disposing the optical coupling component can include disposing an optical coupling medium that is arranged and structured to absorb vibrational shock to protect both the illuminating device and the photodetector. In various embodiments, providing the illuminating device, providing the photodetector, and disposing the optical coupling can include providing the illuminating device, providing the photodetector, and disposing the optical coupling arranged in a housing operable in a wellbore.

Figure 6:
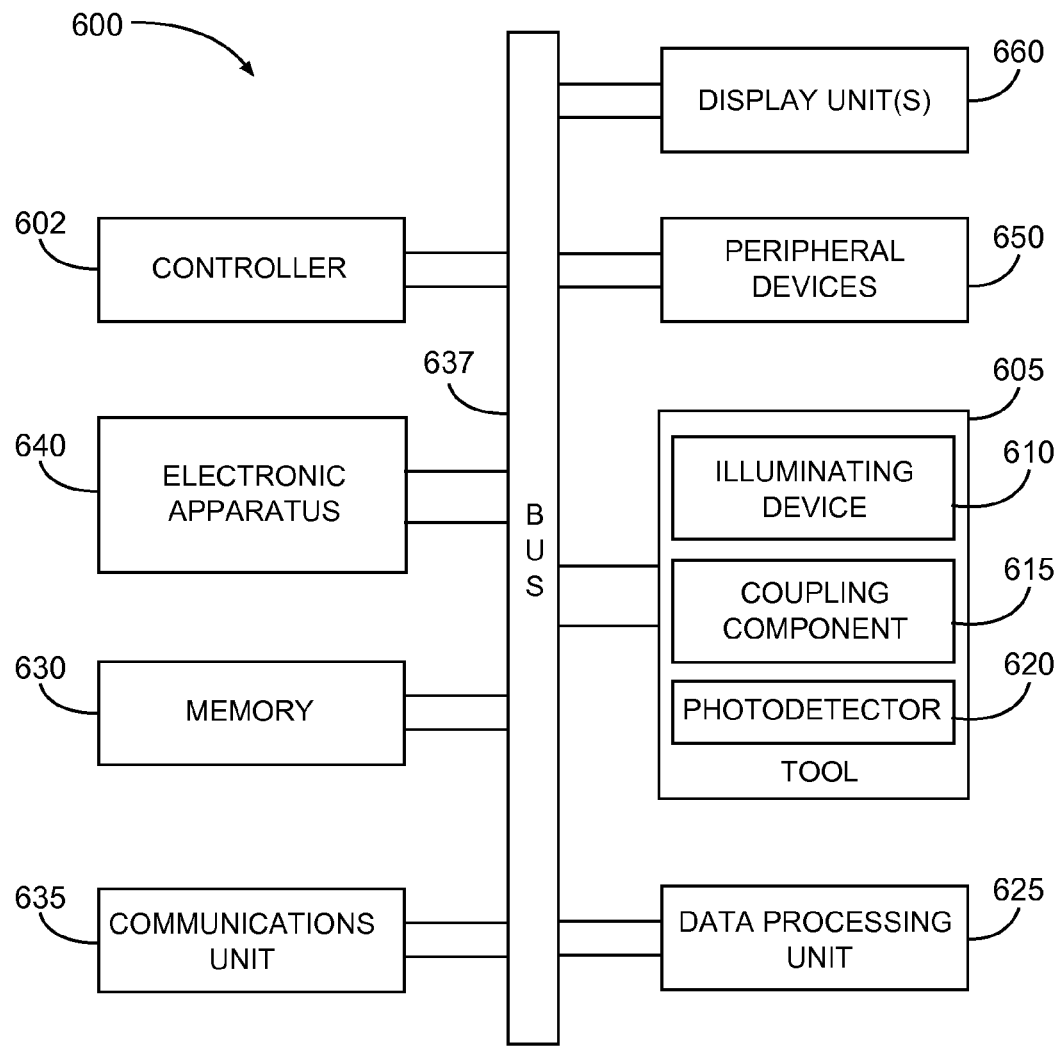
FIG. 6 depicts a block diagram of features of an example system operable with a detector package, in accordance with various embodiments.

FIG. 6 depicts a block diagram of an embodiment of features of an example system 600 operable with detection packages, as described herein or in a similar manner. The system 600 can include a tool 605 having an arrangement of an illuminating device 610, photodetector 620, and coupling component 615 disposed between the illuminating device 610 and the photodetector 620 that can be realized in a similar or identical manner to arrangements and processing discussed herein.

The system 600 can include a controller 602, a memory 630, an electronic apparatus 640, and a communications unit 635. The memory 630 can be structured to include a database. The controller 602, the memory 630, and the communications unit 635 can be arranged to operate as a processing unit to control operation of the illuminating device 610 and to perform operations on the signals collected by the photodetector 620 to conduct evaluations of an entity under investigation. A processing unit 625, structured to conduct evaluation of an entity under investigation using one or more detection packages, can be implemented as a single unit or distributed among the components of the system 600 including electronic apparatus 640. The electronic apparatus 640 can provide other circuitry for operation of the system 600. The controller 602 and the memory 630 can operate to control use of the tool 605 and to manage processing schemes associated with detection signals provided from photodetector 620. The illuminating device 610, photodetector 620, and coupling component 615 can be configured, for example, to operate similar to or identical to the components discussed herein or similar to or identical to any of methods discussed herein.

The communications unit 635 may include downhole communications for appropriately located sensors in a drilling operation. Such downhole communications can include a telemetry system. The communications unit 635 may use combinations of wired communication technologies and wireless technologies at frequencies that do not interfere with on-going measurements.

The system 600 can also include a bus 637, where the bus 637 provides electrical conductivity among the components of the system 600. The bus 637 can include an address bus, a data bus, and a control bus, each independently configured or in an integrated format. The bus 637 can be realized using a number of different communication mediums that allows for the distribution of components of the system 600. The bus 637 can include a network. Use of the bus 637 can be regulated by the controller 602.

In various embodiments, the peripheral devices 650 can include additional storage memory and other control devices that may operate in conjunction with the controller 602 and the memory 630. In an embodiment, the controller 602 can be realized as a processor or a group of processors that may operate independently depending on an assigned function.

The system 600 can include display unit(s) 660 as a distributed component that may be located remote from the entity under investigation using the tool 604, where the display unit(s) 660 can be used with instructions stored in the memory 630 to implement a user interface to monitor the operation of the tool 605 or components distributed within the system 600. The user interface may be used to input parameter values for thresholds such that the system 600 can operate autonomously substantially without user intervention in a variety of applications. The user interface can also provide for manual override and change of control of the system 600 to a user. Such a user interface can be operated in conjunction with the communications unit 635 and the bus 637.

Figure 7:
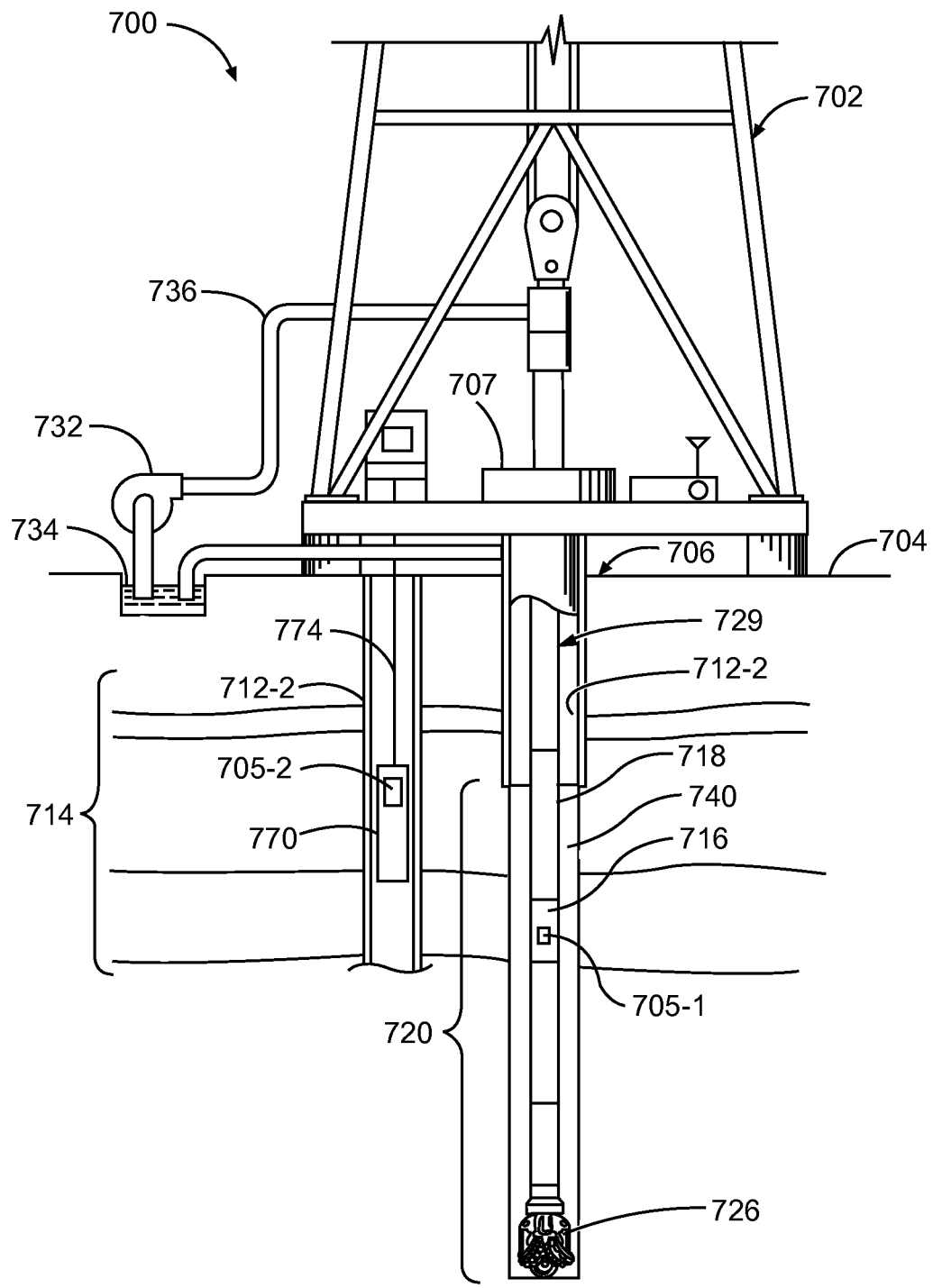
FIG. 7 depicts an example system at a drilling site, where the system is operable with a detector package, in accordance with various embodiments.

FIG. 7 depicts an example system 700 at a drilling site, where the system is operable with detection packages, as described herein or in a similar manner. The system 700 can include a tool 705-1, 705-2, or both 705-1 and 705-2 to conduct measurements and analysis using one or more detection packages as taught herein. Tools 705-1 and 705-2 can be realized in a similar or identical manner to arrangements taught herein.

System 700 can include a drilling rig 702 located at a surface 704 of a well 706 and a string of drill pipes, that is, drill string 729, connected together so as to form a drilling string that is lowered through a rotary table 707 into a wellbore or borehole 712-1. Drilling rig 702 can provide support for drill string 729. Drill string 729 can operate to penetrate rotary table 707 for drilling the borehole 712-1 through subsurface formations 714. Drill string 729 can include drill pipe 718 and a bottom hole assembly 720 located at the lower portion of drill pipe 718.

The bottom hole assembly 720 can include a drill collar 716 and a drill bit 726. Drill bit 726 can operate to create borehole 712-1 by penetrating the surface 704 and the subsurface formations 714. Bottom hole assembly 720 can include tool 705-1 attached to drill collar 716 to perform measurements to conduct formation evaluation. Tool 705-1 can be structured for an implementation in a measure-while-drilling (MWD) system such as a logging-while-drilling (LWD) system. The housing containing tool 705-1 can include electronics to control tool 705-1 and collect responses from photodetector(s) of tool 705-1. Such electronics may include a processing unit to provide analysis of the formation to the surface over a standard communication mechanism for operating in a well. Alternatively, electronics can include a communications interface to provide signals output by photodetector(s) of tool 705-1 to the surface over a standard communication mechanism for operating in a well, where these output signals can be analyzed at a processing unit at the surface.

During drilling operations, drill string 729 can be rotated by rotary table 707. In addition to, or alternatively, the bottom hole assembly 720 can also be rotated by a motor (e.g., a mud motor) that is located downhole. Drill collars 716 can be used to add weight to drill bit 726. Drill collars 716 also can stiffen the bottom hole assembly 720 to allow the bottom hole assembly 720 to transfer the added weight to drill bit 726, and in turn, assist drill bit 726 in penetrating surface 704 and subsurface formations 714.

During drilling operations, a mud pump 732 can pump drilling fluid (sometimes known by those of skill in the art as "drilling mud") from a mud pit 734 through a hose 736 into drill pipe 718 and down to drill bit 726. The drilling fluid can flow out from drill bit 726 and be returned to the surface 704 through an annular area 740 between drill pipe 718 and the sides of the borehole 712-1. The drilling fluid may then be returned to mud pit 734, where such fluid is filtered. In some embodiments, the drilling fluid can be used to cool drill bit 726, as well as to provide lubrication for drill bit 726 during drilling operations. Additionally, the drilling fluid may be used to remove subsurface formation 714 cuttings created by operating drill bit 726.

In various embodiments, tool 705-2 may be included in a tool body 770 coupled to a logging cable 774 such as, for example, for wireline applications. The tool body 770 containing the tool 705-2 can include electronics to control tool 705-2 and collect responses from photodetector(s) of tool 705-2. Such electronics can include a processing unit to provide analysis of the formation to the surface over a standard communication mechanism for operating in a well. Alternatively, electronics can include a communications interface to provide signals output by photodetector(s) of tool 705-2 to the surface over a standard communication mechanism for operating in a well, where these output signals can be analyzed at a processing unit at the surface. The logging cable 774 may be realized as a wireline (multiple power and communication lines), a mono-cable (a single conductor), and/or a slick-line (no conductors for power or communications), or other appropriate structure for use in the borehole 712. Though, for convenience, FIG. 7 depicts both an arrangement for wireline applications and an arrangement for LWD applications, the system 700 may be also realized for one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
an illuminating device that produces a light signal with an emission wavelength in response to radiation incident to the illuminating device;
a photodetector with a region of highest quantum efficiency in a spectral response of the photodetector; and
an optical coupling component, disposed between the illuminating device and the photodetector, to absorb the light signal from the illuminating device and emit a modified light signal with a wavelength in the region of highest quantum efficiency in the spectral response of the photodetector, wherein the optical coupling component is arranged and structured to absorb vibrational shock to protect both the illuminating device and the photodetector.

2. The apparatus of claim 1, wherein the optical coupling component is an optical upconverter.

3. The apparatus of claim 2, wherein the optical coupling component is an optical coupling medium that is doped, coated, or doped and coated to match the emission wavelength of the illuminating device to the spectral response of the photodetector.

4. The apparatus of claim 3, wherein the illuminating device is a scintillator.

5. The apparatus of claim 4, wherein the scintillator is a gamma-ray scintillator.

6. The apparatus of claim 1, wherein the optical coupling component is doped, coated, or doped and coated with a molecular complex.

7. The apparatus of claim 6, wherein the molecular complex is structured to perform photon triplet-triplet annihilation upconversion.

8. The apparatus of claim 6, wherein the molecular complex includes 9,10-diphenylanthracene combined with a platinum bisacetylide complex.

9. The apparatus of claim 1, wherein the illuminating device, the photodetector, and the optical coupling component are arranged in a housing operable in a wellbore.

10. The apparatus of claim 1, wherein the optical coupling component upconverts light with a peak wavelength of 470-490nm to light with a peak wavelength of 370-380 nm.

11. A method comprising:
receiving radiation at a scintillator;
receiving light with an emission wavelength from the scintillator at an optical coupling medium in response to receiving the radiation at the scintillator, wherein the optical coupling medium is arranged and structured to absorb vibrational shock to protect both the illuminating device and a photodetector;
upconverting, using the optical coupling medium, the light received from the scintillator to an upconverted light at a lower wavelength, wherein the lower wavelength is within a region of highest quantum efficiency in a spectral response curve of the photodetector;
receiving the upconverted light at the photodetector; and
generating a detection signal with the photodetector.

12. The method of claim 11, wherein the optical coupling medium is doped, coated, or doped and coated to match the emission wavelength of the scintillator to the spectral response curve of the photodetector.

13. The method of claim 12, wherein the scintillator is a gamma-ray scintillator.

14. The method of claim 12, wherein the optical coupling medium is doped, coated, or doped and coated with a molecular complex.

15. The method of claim 14, wherein the molecular complex is structured to perform photon triplet-triplet annihilation upconversion.

16. The method of claim 11, wherein receiving the radiation at the scintillator, receiving the light at the optical coupling medium, and upconverting the light is conducted in a housing operable in a wellbore.

17. The method of claim 11, wherein upconverting the light comprises upconverting light with a peak wavelength of 470-490 nm to light with a peak wavelength of 370-380 nm.

18. A system comprising:
an illuminating device that produces a light signal with an emission wavelength in response to radiation incident to the illuminating device;
a photodetector with a region of highest quantum efficiency in a spectral response of the photodetector;
an optical coupling component, disposed between the illuminating device and the photodetector, to absorb the light signal from the illuminating device and emit a modified light signal with a wavelength in the region of highest quantum efficiency in the spectral response of the photodetector, wherein the optical coupling component comprises an optical coupling medium that is arranged and structured to absorb vibrational shock to protect both the illuminating device and the photodetector; and
a machine-readable storage device operable to receive electrical signals from the photodetector.

19. The system of claim 18, wherein the optical coupling component comprises an optical upconverter.

20. The system of claim 19, wherein the optical coupling component is doped, coated, or doped and coated with a molecular complex.

21. The system of claim 20, wherein the molecular complex is structured to perform photon triplet-triplet annihilation upconversion.

22. The system of claim 18, wherein the optical coupling medium is doped, coated, or doped and coated to absorb the emission wavelength of the illuminating device and to emit the modified light signal with a wavelength in the region of highest quantum efficiency in the spectral response of the photodetector.

23. The system of claim 18, wherein the illuminating device comprises a scintillator.

24. The system of claim 18, further comprising electronics to provide signals output by the photodetector.

25. The system of claim 18, wherein the optical coupling component upconverts light with a peak wavelength of 470-490 nm to light with a peak wavelength of 370-380 nm.

* * * * *